March 22, 1938.   S. B. JACKSON   2,112,159
APPARATUS FOR TREATING SEEDS
Filed April 23, 1934

INVENTOR
Samuel B. Jackson
BY
ATTORNEY

Patented Mar. 22, 1938

2,112,159

UNITED STATES PATENT OFFICE 2,112,159

APPARATUS FOR TREATING SEEDS

Samuel B. Jackson, Iowa Park, Tex.

Application April 23, 1934, Serial No. 722,006

1 Claim. (Cl. 83—28)

This invention has relation to new and improved processes and apparatus for treating various seeds, such as seeds of wheat, oats, barley, emmer, rye, and other seeds with formaldehyde gas, halogen gas, or material selected from a group consisting of hydrochloric acid gas, hydrobromic acid gas or hydroiodic acid gas, or heat, or with a combination of one or more of these gases and heat, or these gases in combination or singly with or without the application of heat, or with heat only.

The object of this invention is to destroy or remove seed borne bacteria and fungi of plant diseases, the seed borne spores of molds that cause seeds to decay, and control the different smuts that cause large annual losses to growers of cereal crops and corn; to control the seed borne fungi that cause cotton seedlings to damp off and that cause the loss of squares and bolls later in the season from anthracnose, angular leaf spot, boll rot, bacterial blight or other seed borne diseases of cotton; to destroy or control seed borne insect pests, their eggs, larvae and pupae by the application of gas and/or dry heat to the seed while the seed are being agitated in a closed chamber.

Treating cottonseed with dry heat permits the use of higher temperatures without injury to the seed, an improvement on present methods of treating cottonseed to control insect pests.

This specially designed seed treating apparatus lessens the danger from over-heating or excessive gas treatment of seed and therefore improves the quality and germination of the treated seed.

In the present process, the seed are admitted to a chamber where they are subjected to heat, agitation and treatment with halogen gas or formaldehyde gas, or material selected from a group consisting of hydrochloric acid gas, hydrobromic acid gas or hydroiodic acid gas, under pressure. The temperature and pressure of treatment depend largely upon the condition and kind of seed to be treated. The time of the process which varies from three minutes to one hour depends upon the kind of seed and the condition of seed. Considerable care must be taken in attaining the desired temperature because seed is a poor conductor of heat and accordingly, unless careful attention is given to the manner of heating, a large proportion of the seed will be burned and will be of no use for planting purposes.

From the above outline, it will be seen that to carry out this method of treating and disinfecting seeds, there are four things necessary, namely, dry halogen acid gas, formaldehyde gas, or material selected from a group consisting of hydrochloric acid gas, hydrobromic acid gas, or hydroiodic acid gas, pressure, proper heating, and agitation of the seed.

The acid gas which is preferably used is hydrochloric acid gas used in the dry state or as nearly dry as it can be made. Instead of hydrochloric acid gas, of course, either hydrobromic acid gas or hydroiodic acid gas may be used. The pressure is built up by forcing the chemical gas into a chamber which is tightly closed except for the opening through which the gas is being introduced. Heating is effected by application of any suitable source of heat to the outside of the chamber, suitable sources of heat being hot gases of combustion, steam, hot water, hot oil, or electrical heating means. The agitation of the seed which is necessary to insure uniform heating is effective by placing the seed in a revolving drum or chamber, or the like, externally heated. Without agitation the seed next to the heating surface would be burned or the germ thereof killed before the heat would penetrate to the center of the mass of seed. On the other hand, if proper agitation takes place, the seed is uniformly heated. The agitation further aids in the proper distribution of chemical gas to the surfaces of all the individual seeds thereby hastening the process.

Suitable apparatus for carrying out the process is illustrated in the drawing forming part of this application wherein like characters denote corresponding parts in the several views, and in which—

Figure 1:
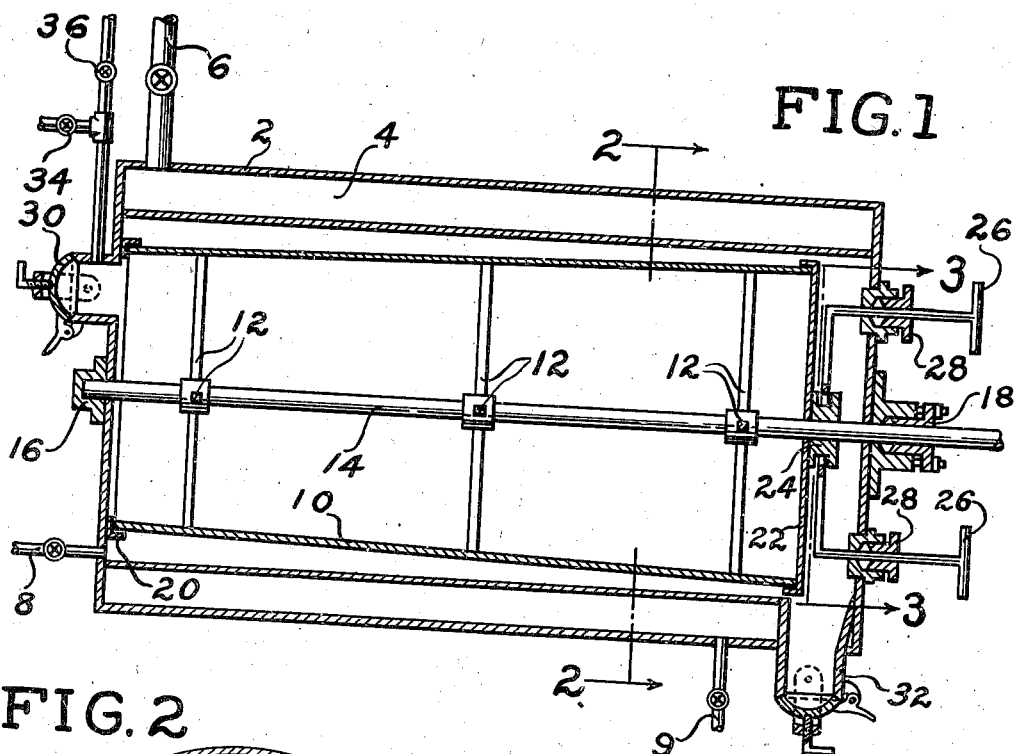
Figure 1 illustrates a vertical sectional view of an apparatus embodying the invention for carrying the process into effect.
Figure 2:
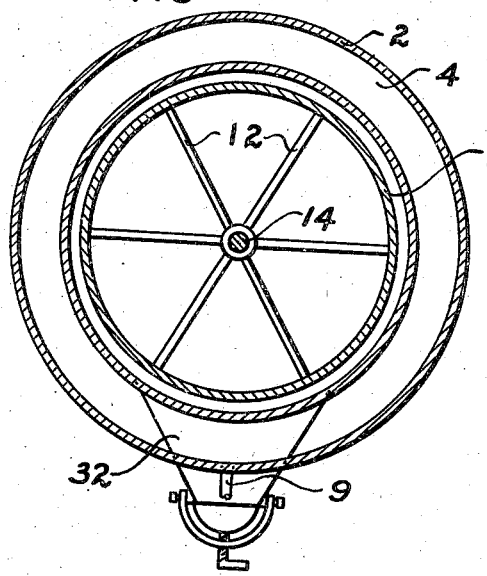
Figure 2 illustrates a sectional view on a line corresponding to the line 2—2 of Figure 1.
Figure 3:
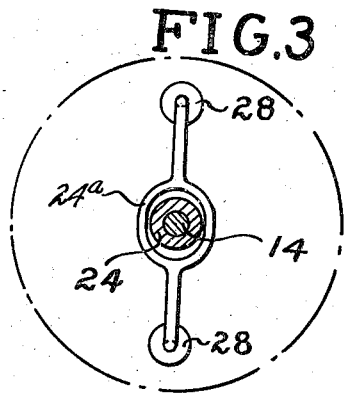
Figure 3 illustrates a sectional view on a line corresponding to the line 3—3 of Figure 1.

This apparatus comprises an outer casing 2 provided with a jacket 4 for the reception of heating fluid, such as oil or steam. This heating fluid may enter through the pipe 6 and pass outwardly through the pipe 9, the various outlets being controlled by valves.

Within the casing, there is located an inner chamber 10 in the form of a truncated cone open at both ends, this chamber being secured to a shaft 14 through the medium of spokes 12. The shaft 14 is journaled at 16 in one end of the casing and passes through a suitable stuffing box 18 in the other end thereof, being driven from a suitable source of power. The smaller receiving end of the chamber 10 fits snugly inside the circular angle iron 20 carried by the end wall of the casing.

The larger end of the chamber is normally covered by the closure 22 which is provided with a hub portion 24 surrounding the shaft so that the closure is movable axially of the shaft either to a position closing the chamber or to a position which opens the same. The hub 24 is provided with an annular groove within which a yoke 24ᵃ is seated, the said yoke being carried by rods 26 and the ends of rods 26 are slidable through suitable stuffing boxes 28 in the end of the casing so that the closure may be moved lengthwise of the shaft from the exterior of the casing without permitting the escape of the aforesaid gases.

The introduction of seed into the chamber takes place through a suitable valved opening 30 which may communicate with a supplying hopper, or the like, not shown. Discharge of seed from the chamber takes place through a suitable valved opening 32, the valves associated with the openings 30 and 32 being provided so that gas pressure may be maintained within the apparatus. Valved openings 34 and 36 provide respectively for the inflow and outflow of the treating gas.

In carrying out the process for treating and disinfecting seed in the above apparatus, the temperature of the inner chamber is brought to a degree between 140° F. and 240° F. by the use of suitable heating medium in the jacket. The seed to be treated are charged into the interior of the chamber 10 through the opening 30, this inner chamber being caused to rotate by reason of the power drive. At this time, of course, the closure of the inner chamber is in place. As soon as the inner chamber is charged, the valves of openings 30 and 32 are closed and gases as aforesaid are introduced until a pressure above atmospheric is built up in the interior of the apparatus, this pressure being five to fifteen pounds above atmospheric.

After suitable time has elapsed, which is usually from three to fifteen minutes, the pressure is released through the opening 36 and the closure or valve opened at 32. The rods 26 are then pulled outwardly to remove the closure from the chamber 10 by sliding it along the shaft 14 whereupon the seed falls through the opening, due to the truncated form of the chamber 10 and the fact that it is still revolving. Because the seed are heated in a large mass with agitation in the inner chamber which was first brought to a temperature of between 140° F. and 240° F., the seed upon discharge will only have a temperature of from 140° F. to 212° F. A pipe 8 is in communication with the interior of the casing for the purpose of supplying an agent which may be used in cleaning the said casing.

It will be obvious that depending upon the relative temperature, pressure and time used, the various factors may vary widely. That is, the higher the temperature and pressure, the lower the period required, and vice versa. While, in general, it is desirable to carry out the process in the minimum time, nevertheless, the condition of the seed or the danger of overheating may make it preferable to carry out the process at lower temperatures and pressures during longer times.

While the disclosed apparatus is primarily adapted for the treatment of cottonseed, seed, grains, or corn, it will be clear that it may be used to treat, parch, disinfect, or sterilize all kinds of seeds, grains, peas, beans, berries, nuts, tubers, or roots with or without various gases being used, such treatment taking place at atmospheric or superatmospheric pressure. The apparatus may also be used for heat treatment alone, without gas or gases.

With regard to the treatment of cotton seed, the present process and apparatus will be effective in delinting the said seed or otherwise treating it.

I claim:

Apparatus for treating seed or the like comprising a closed casing, an inner chamber in the form of a truncated cone, a rotatable shaft on which the chamber is mounted, a removable closure for the larger end of the chamber rotatable therewith, means extending exteriorly of the casing and connected to the closure for moving the closure axially, the said closure being rotatable with the inner chamber and with relation to the last mentioned means, stuffing boxes in the wall of the casing through which the last mentioned means extend for preventing the escape of gas from the casing, and means for heating the interior of the casing.

SAMUEL B. JACKSON.